United States Patent

Sugiyama

[11] 4,019,810
[45] Apr. 26, 1977

[54] PHOTOGRAPHIC WIDE ANGLE LENS

[75] Inventor: Takahiro Sugiyama, Tokyo, Japan

[73] Assignee: Asahi Kogaku Kogyo Kabushiki Kaisha, Tokyo, Japan

[22] Filed: Nov. 17, 1975

[21] Appl. No.: 632,599

[30] Foreign Application Priority Data
Nov. 18, 1974  Japan .................. 49-132507

[52] U.S. Cl. ............................................. 350/214
[51] Int. Cl.² ...................................... G02B 13/04
[58] Field of Search .........................., 350/214

[56] References Cited
UNITED STATES PATENTS
3,622,227  11/1971  Shimiju .................. 350/214

Primary Examiner—John K. Corbin
Assistant Examiner—Conrad Clark
Attorney, Agent, or Firm—Sughrue, Rothwell, Mion, Zinn & Macpeak

[57] ABSTRACT

A wide angle lens which is designed to achieve miniaturization without sacrificing optical quality is disclosed.

4 Claims, 4 Drawing Figures

PHOTOGRAPHIC WIDE ANGLE LENS

BACKGROUND OF THE INVENTION

Wide angle lens systems are known in the art but heretofore have not been suitable for miniaturization.

SUMMARY OF THE INVENTION

A photographic wide angle lens comprising seven elements composed of eight lenses, said elements consisting of a first element in the form of a negative meniscus lens with its convex surface directed toward the object, a second element in the form of a positive miniscus lens with its concave surface directed toward the object, a third element in the form of a negative meniscus lens with its convex surface directed toward the object, a fourth element in the form of a positive lens in which two lenses, positive and negative, are joined together, a fifth element in the form of a negative lens, a sixth element in the form of a positive lens, and a seventh element in the form of a positive lens, the wide angle lens meeting the conditions as follows:

$r_3 < 0$              (I)
$0.6F < r_7 < 1.5F, r_7 > 0$     (II)
$0.18F < d_5 + d_6 < 0.33F$     (III)
$F/0.8 < |F_{1,2,3,4,5,6}| < F/0.4, F_{1,2,3,4,5,6} < 0$    (IV)
$0.27F < d_{10} + d_{11} + d_{12} + d_{13} + d_{14} < 0.45F$    (V)

DETAILED DESCRIPTION OF THE INVENTION

Figure 1:
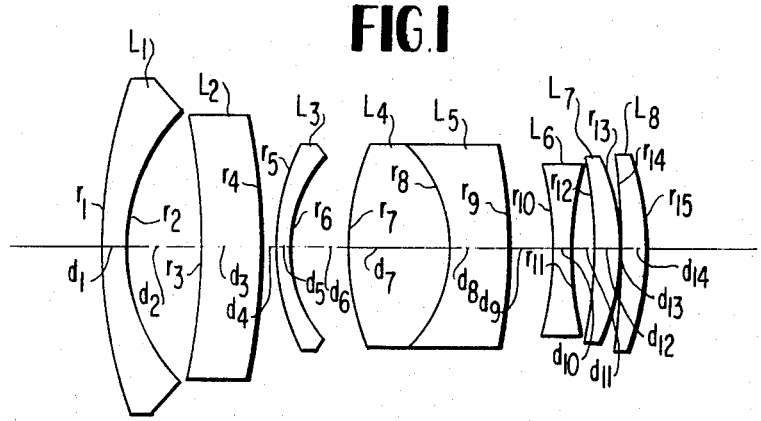
FIG. 1 illustrates a structure of a lens system in Example 1.

This invention provides a photographic wide angle lens having an aperture ratio of about 1 : 2.0 and a large angular field of approximately 75°, of which the backfocus is sufficiently long, that is, more than 1.25 times of the combined focal length. Additionally the lens system can satisfactorily correct various aberrations created in lens systems while maintaining the miniaturization of the lens systems.

The photographic wide angle lens according to the present invention comprises seven elements composed of eight lenses, said elements consisting of a first section in the form of a negative meniscus lens $L_1$ with its convex surface directed toward the object, a second element in the form of a positive meniscus lens $L_2$ with its concave surface directed toward the object, a third element in the form of a negative meniscus lens $L_3$ with its convex surface directed toward the object, a forth element in the form of a positive lens in which two lenses, positive lens $L_4$ and negative lens $L_5$, are joined together, a fifth element in the form of a negative lens $L_6$, a sixth element in the form of a positive lens $L_7$, and a seventh element in the form of a positive lens.

The photographic wide angle lens of the invention satisfies the following:

$r_3 < 0$              (I)
$0.6F < r_7 < 1.5F, r_7 > 0$     (II)
$0.18F < d_5 + d_6 < 0.33F$     (III)
$F/0.8 < |F_{1,2,3,4,5,6}| < F/0.4, F_{1,2,3,4,5,6} < 0$    (IV)
$0.27F < d_{10} + d_{11} + d_{12} + d_{13} + d_{14} < 0.45F$    (V)

where,
$F$ is the combined focal length in the whole system;
$F_{1,2,3 \ldots i}$ is the combined focal length of lenses $l$ through $i$;
$d_j$ is the lens thickness or the air spacing along the optical axis between surface $j$ and surface $j+1$;
$r_k$ is the radius of curvature of the $k$ surface;
$N_i$ is the refractive index of the $i$ lens;
$\nu_i$ is Abbe's number for the $i$ lens.

These conditions noted above will be described hereinafter. Condition (I):

If $r_3 < 0$ it has the advantage of making the backfocus longer while at the same time decreasing the distortion aberration.

Condition (II):

$$0.6F < r_7 < 1.5F, r_7 > 0$$

This condition is established for reasons such that $F_{NO}$ is a retro-focus type wide angle lens, which is light in excess of about 1 : 2.0 in aperture ratio, and if an attempt is made to design a small lens system, a high dimensional spherical aberration would be produced. This creates the necessity for correcting and preventing the spherical aberration from being developed. Where the upper limit of $r_7$ is in excess of $1.5F$, action to the high dimensional spherical aberration decreases to thereby increase the amount of aberration, and hence, it becomes difficult to reduce the spherical aberration below a desired amount. Where the lower limit is less than $0.6F$, action to the high dimensional spherical aberration becomes too great, resulting in a short in correction of spherical aberration of the peripheral edge light flux and in an occurrence of coma aberration with respect to the light flux having a small angular field, which is not desirable.

Condition (III):

$$0.18F < d_5 + d_6 < 0.33F$$

This condition is established to miniaturize the lens system and at the same time to obtain the backfocus as required. Where the lower limit is less than $0.18F$, it becomes difficult to obtain the required backfocus. Where the upper limit is in excess of $0.33F$, the required backfocus may be obtained, but the quantity of circumferential light likely decreases and for this reason, the diameter of the front lens or rear lens needs to be made greater, with the result that the thickness in the center of the lens becomes greater accordingly, which is not suitable for miniaturization.

Condition (IV):

$$F/0.8 < |F_{1,2,3,4,5,6}| < 0.4, F_{1,2,3,4,5,6} < 0$$

This condition is established to obtain the backfocus as required and to satisfactorily correct the coma aberration. Where the lower limit is shorter than $F/0.8$, it may easily increase the backfocus in the value more than as required, while the burden of the seventh and the eighth lenses increases, with the result that it becomes difficult to properly maintain the spherical aberration without exerting an effect upon other aberrations and either of surfaces such as the second surface, the sixth surface and the eleventh surface, which are negative, will have a powerful curvature, thus worsening the coma aberration. Where the lower limit exceeds $F/0.4$ and becomes long, the burden of each surface may be decreased, but it is not easy to set the backfocus to a value as required, and additionally is difficult to correct both the spherical aberration and the coma aberration in the tenth surface and the eleventh surface, and moreover it becomes difficult to correct the chromatic aberration.

Condition (V):

$$0.27F < d_{10} + d_{11} + d_{12} + d_{13} + d_{14} < 0.45F$$

This condition is important in maintaining the balance of aberration after the tenth surface and is established for miniaturization if the structure is designed with the same quantity of light. That is, where it is greater than $0.45F$ and, in order not to decrease the amount of circumferential light, the diameter of lenses after the twelfth surface would have to be greater, and in order to restrict the thickness of lenses to a practical range the thickness of the lens must be made thicker to some extent, resulting in a further increase of difficulty in correction of aberration.. Where it is less than $0.27F$, it becomes difficult to maintain the desired brightness and covering angle. Further, in connection with the condition (IV), the power of the sixth lens needs to be decreased to some degree so that a problem occurs in selecting potassium nitrate and the sum of Petzval is also influenced, and therefore, the aforesaid range is moderate.

The lens system according to the present invention is related to a photographic wide angle lens having an aperture ratio of about 1 : 2.0 and a large angular field of approximately 75°, for which backfocus is sufficiently long and lens system is extremely small, and yet the lens system of the invention is particularly effective to satisfactorily correct various aberrations, and particularly, variation in various aberrations relative to limited objects and unlimited objects is minimized to thereby eliminate the provision of a lens correcting mechanism due to the difference in the distance between the objects.

Four examples of specific lens systems according to the present invention will now be given.

EXAMPLE 1

Aperture ratio 1 : 2.0  F = 100  Angular Field 75°

| Lens | Radius of Curvature r | Lens Thickness or Distance d | Refractive Index N | Abbe No. |
|---|---|---|---|---|
| $L_1$ | $r_1 = 199.730$ $r_2 = 68.296$ | $d_1 = 4.126$ | $N_1 = 1.49831$ | $\nu_1 = 65.0$ |
| | | $d_2 = 30.168$ | | |
| $L_2$ | $r_3 = -305.836$ $r_4 = -206.318$ | $d_3 = 24.273$ | $N_2 = 1.68250$ | $\nu_2 = 44.7$ |
| | | $d_4 = 3.710$ | | |
| $L_3$ | $r_5 = 85.301$ $r_6 = 52.914$ | $d_5 = 4.161$ | $N_3 = 1.71300$ | $\nu_3 = 53.9$ |
| | | $d_6 = 23.683$ | | |
| $L_4$ | $r_7 = 104.026$ $r_8 = -52.914$ | $d_7 = 38.455$ | $N_4 = 1.80610$ | $\nu_4 = 40.9$ |
| $L_5$ | $r_9 = -196.956$ | $d_8 = 24.481$ | | |
| | | $d_9 = 17.754$ | $N_5 = 1.72342$ | $\nu_5 = 38.0$ |

EXAMPLE 1-continued

Aperture ratio 1 : 2.0  F = 100  Angular Field 75°

| Lens | Radius of Curvature r | Lens Thickness or Distance d | Refractive Index N | Abbe No. |
|---|---|---|---|---|
| $L_6$ | $r_{10} = -124.352$ $r_{11} = 146.676$ | $d_{10} = 4.161$ | | |
| | | $d_{11} = 8.461$ | $N_6 = 1.84666$ | $\nu_6 = 23.9$ |
| $L_7$ | $r_{12} = -274.954$ $r_{13} = -77.738$ | $d_{12} = 8.842$ | | |
| | | $d_{13} = 0.347$ | $N_7 = 1.73400$ | $\nu_7 = 51.5$ |
| $L_8$ | $r_{14} = -1074.933$ $r_{15} = -115.465$ | $d_{14} = 9.536$ | | |
| | | | $N_8 = 1.71300$ | $\nu_8 = 53.9$ |

$f_B = 127.640$, where $f_B$ is the back focal length
$F_{1,2,3,4,5,6} = -169.837$
The sum of Petzval = 0.168

All linear dimensions given above are in millimeters.

EXAMPLE 2

Aperture ratio 1 : 2.0  F = 100  Angular field 75°

| Lens | Radius of Curvature r | Lens Thickness or Distance d | Refractive Index N | Abbe No. |
|---|---|---|---|---|
| $L_1$ | $r_1 = 161.392$ $r_2 = 65.764$ | $d_1 = 4.167$ | $N_1 = 1.51633$ | $\nu_1 = 64.1$ |
| | | $d_2 = 30.833$ | | |
| $L_2$ | $r_3 = -284.153$ $r_4 = -223.321$ | $d_3 = 20.139$ | $N_2 = 1.72000$ | $\nu_2 = 50.2$ |
| | | $d_4 = 5.486$ | | |
| $L_3$ | $r_5 = 83.656$ $r_6 = 54.749$ | $d_5 = 4.167$ | $N_3 = 1.71300$ | $\nu_3 = 53.9$ |
| | | $d_6 = 22.986$ | | |
| $L_4$ | $r_7 = 114.990$ $r_8 = -49.854$ | $d_7 = 48.854$ | $N_4 = 1.80610$ | $\nu_4 = 40.9$ |
| $L_5$ | $r_9 = -177.063$ | $d_8 = 10.938$ | $N_5 = 1.72342$ | $\nu_5 = 38.0$ |
| | | $d_9 = 21.250$ | | |
| $L_6$ | $r_{10} = -110.330$ $r_{11} = 171.084$ | $d_{10} = 8.090$ | $N_6 = 1.84666$ | $\nu_6 = 23.9$ |
| | | $d_{11} = 7.326$ | | |
| $L_7$ | $r_{12} = -228.944$ $r_{13} = -78.323$ | $d_{12} = 12.396$ | $N_7 = 1.73400$ | $\nu_7 = 51.5$ |
| | | $d_{13} = 0.521$ | | |
| $L_8$ | $r_{14} = 3317.347$ | $d_{14} = 12.222$ | $N_8 = 1.73400$ | $\nu_8 = 51.5$ |

EXAMPLE 2-continued

Aperture ratio 1 : 2.0   F = 100   Angular field 75°

| Lens | Radius of Curvature r | Lens Thickness or Distance d | Refractive Index N | Abbe No. |
|---|---|---|---|---|
| | $r_{15} = -126.916$ | | | |

$f_B = 127.467$
$F_{1,2,3,4,5,6} = -170.561$
The sum of Petzval = 0.168

Figure 2:
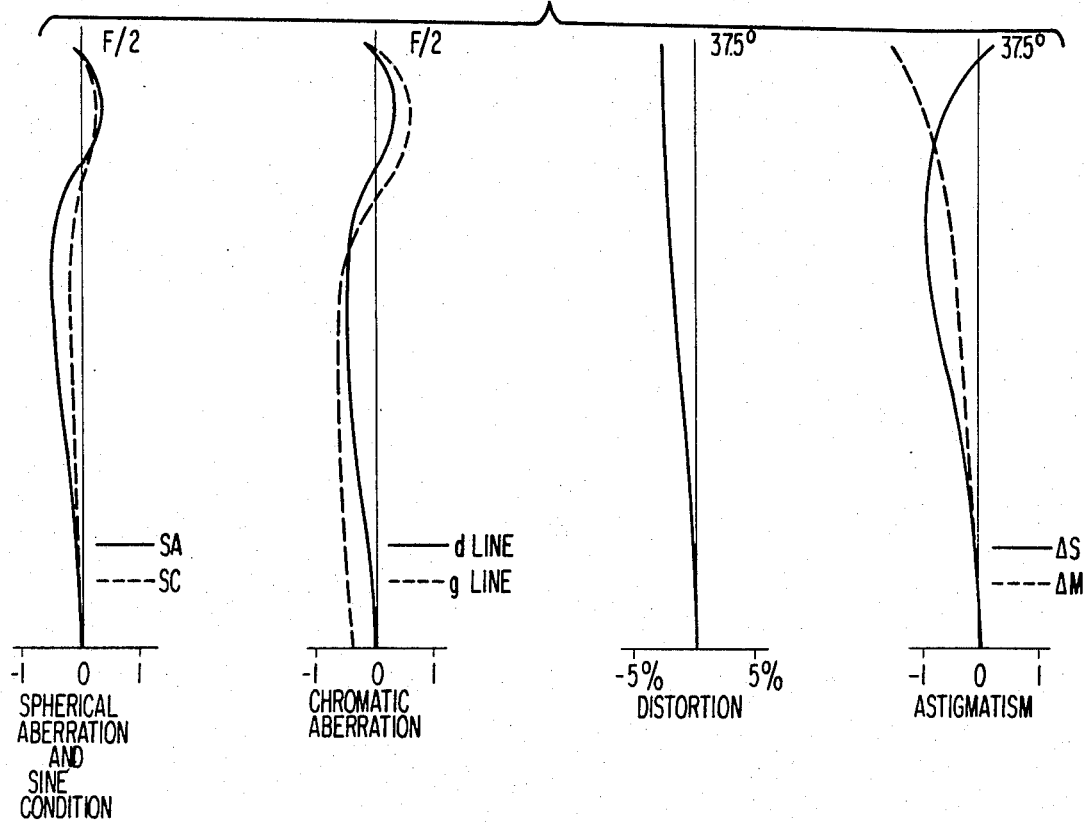
FIG. 2 shows the aberration curves for Example 1.

Example 2 is substantially the same as Example 1. The aberration curves for the lens system of Example 1 are shown in FIG. 2.

EXAMPLE 3

Aperture ratio 1 : 2.0   F = 100   Angular field 75°

| Lens | Radius of Curvature r | Lens Thickness or Distance d | Refractive Index N | Abbe No. |
|---|---|---|---|---|
| $L_1$ | $r_1 = 203.719$ | $d_1 = 4.514$ | $N_1 = 1.49831$ | $\nu_1 = 65.0$ |
| | $r_2 = 66.968$ | | | |
| | | $d_2 = 30.660$ | | |
| $L_2$ | $r_3 = -357.455$ | $d_3 = 26.111$ | $N_2 = 1.68250$ | $\nu_2 = 44.7$ |
| | $r_4 = -193.555$ | | | |
| | | $d_4 = 4.063$ | | |
| $L_3$ | $r_5 = 87.118$ | $d_5 = 4.618$ | $N_3 = 1.71300$ | $\nu_3 = 53.9$ |
| | $r_6 = 53.427$ | | | |
| | | $d_6 = 26.180$ | | |
| $L_4$ | $r_7 = 87.500$ | $d_7 = 37.500$ | $N_4 = 1.70154$ | $\nu_4 = 41.1$ |
| | $r_8 = -54.156$ | | | |
| | | $d_8 = 16.528$ | $N_5 = 1.72342$ | $\nu_5 = 38.0$ |
| | $r_9 = -112.263$ | | | |
| | | $d_9 = 15.799$ | | |
| $L_5$ | $r_{10} = -95.486$ | $d_{10} = 6.146$ | $N_6 = 1.84666$ | $\nu_6 = 23.9$ |
| | $r_{11} = 146.264$ | | | |
| | | $d_{11} = 9.757$ | | |
| $L_6$ | $r_{12} = -158.049$ | $d_{12} = 10.486$ | $N_7 = 1.73400$ | $\nu_7 = 51.5$ |
| | $r_{13} = -71.695$ | | | |
| | | $d_{13} = 0.347$ | | |
| $L_7$ | $r_{14} = 1338.583$ | $d_{14} = 10.174$ | $N_8 = 1.72600$ | $\nu_8 = 53.6$ |
| | $r_{15} = -123.855$ | | | |

$f_B = 133.757$
$F_{1,2,3,4,5,6} = -154.392$
The sum of Petzval = 0.193

Figure 3:
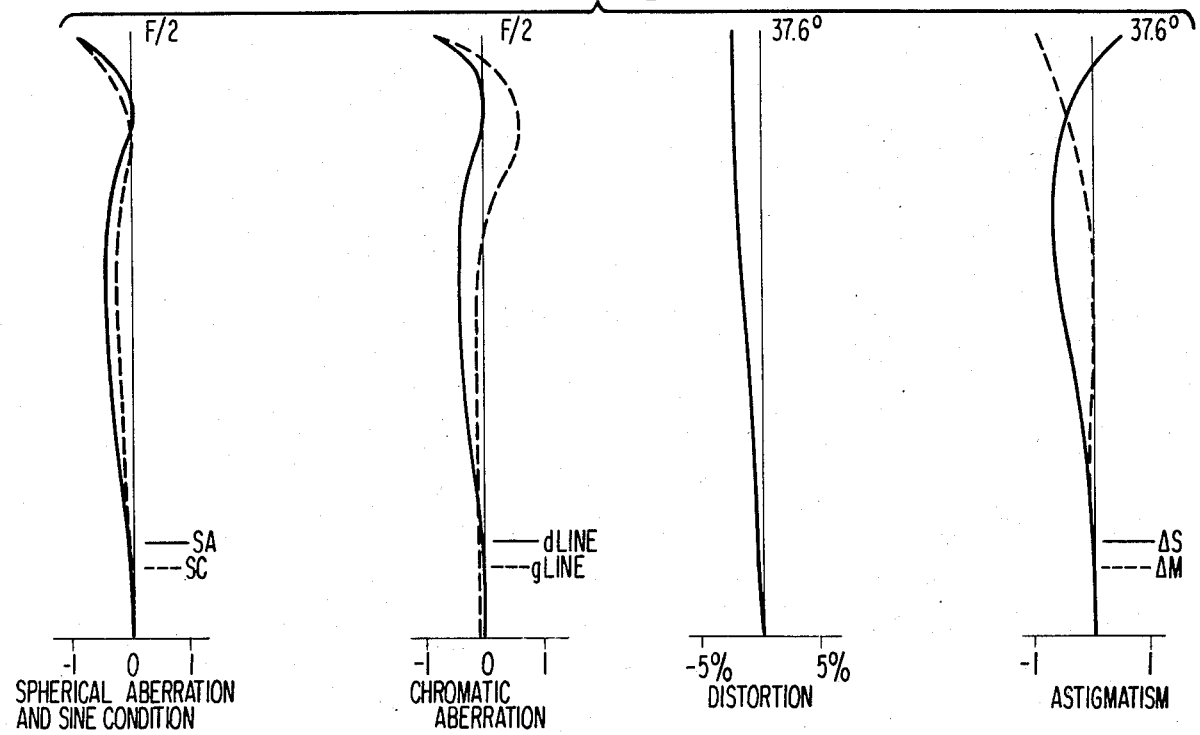
FIG. 3 shows the aberration curves in Example 3.
Figure 4:
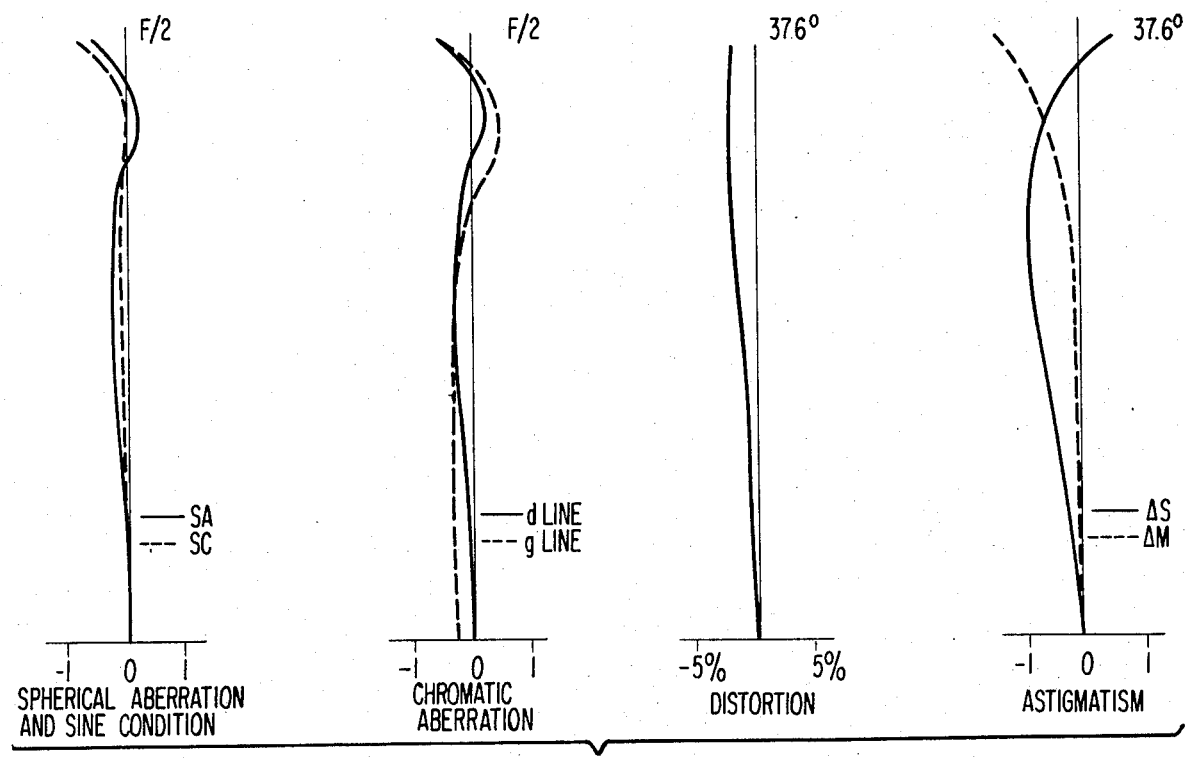
FIG. 4 shows the aberration curves in Example 4.

The aberration curves for a lens system according to Example 3 are shown in FIG. 3.

EXAMPLE 4

Aperture ratio 1 : 2.0   F = 100   Angular field 75°

| Lens | Radius of Curvature r | Lens Thickness or Distance d | Refractive Index N | Abbe No. |
|---|---|---|---|---|
| $L_1$ | $r_1 = 221.750$ | $d_1 = 4.757$ | $N_1 = 1.49831$ | $\nu_1 = 65.0$ |
| | $r_2 = 70.339$ | | | |
| | | $d_2 = 29.410$ | | |
| $L_2$ | $r_3 = -316.656$ | $d_3 = 10.764$ | $N_2 = 1.67790$ | $\nu_2 = 53.3$ |
| | $r_4 = -191.116$ | | | |
| | | $d_4 = 4.722$ | | |
| $L_3$ | $r_5 = 96.181$ | $d_5 = 4.618$ | $N_3 = 1.71300$ | $\nu_3 = 53.9$ |
| | $r_6 = 53.646$ | | | |
| | | $d_6 = 24.270$ | | |
| $L_4$ | $r_7 = 92.708$ | $d_7 = 11.389$ | $N_4 = 1.72342$ | $\nu_4 = 38.0$ |
| | $r_8 = 63.700$ | | | |
| $L_5$ | $r_9 = -139.976$ | $d_8 = 50.451$ | $N_5 = 1.80610$ | $\nu_5 = 40.9$ |
| | | $d_9 = 13.681$ | | |
| $L_6$ | $r_{10} = -102.431$ | $d_{10} = 5.000$ | $N_6 = 1.84666$ | $\nu_6 = 23.9$ |
| | $r_{11} = 134.307$ | | | |
| | | $d_{11} = 7.917$ | | |
| $L_7$ | $r_{12} = -272.177$ | $d_{12} = 11.319$ | $N_7 = 1.73400$ | $\nu_7 = 51.5$ |
| | $r_{13} = -74.233$ | | | |
| | | $d_{13} = 0.347$ | | |
| $L_8$ | $r_{14} = -6944.444$ | $d_{14} = 12.778$ | $N_8 = 1.72600$ | $\nu_8 = 53.6$ |
| | $r_{15} = -128.753$ | | | |

$f_B = 126.732$
$F_{1,2,3,4,5,6} = -154.895$
The sum of Petzval = 0.178

What is claimed is:

1. A photographic wide angle lens system comprising seven elements composed of eight lenses, said elements consisting of a first element in the form of a negative meniscus lens $L_1$ convex to the object, a second element in the form of a positive meniscus lens $L_2$ concave to the object, a third element in the form of a negative meniscus lens $L_3$ convex to the object, a fourth element in the form of a positive lens in which two lenses, a positive lens $L_4$ and a negative lens $L_5$, are joined together, a fifth element in the form of a negative lens $L_6$, a sixth element in the form of a positive lens $L_7$, and a seventh element in the form of a positive lens $L_8$, wherein the radii of curvature $r$, the lens thicknesses or distance between lenses $d$, the refractive indices N and the Abbe Numbers $\nu$ of the lens system are:

Aperture ratio 1 :2.0, $F = 100$, where $F$ is the focal length of the whole system, Angular field 75°

| lens | Radius of Curvature r (mm) | Lens Thickness or Distance d (mm) | Refractive Index N | Abbe No. $\nu$ |
|---|---|---|---|---|
| $L_1$ | $r_1 = 199.730$ | $d_1 = 4.126$ | $N_1 = 1.49831$ | $\nu_1 = 65.0$ |
| | $r_2 = 68.296$ | | | |
| | | $d_2 = 30.168$ | | |
| $L_2$ | $r_3 = -305.836$ | $d_3 = 24.273$ | $N_2 = 1.68250$ | $\nu_2 = 44.7$ |

-continued

| lens | Radius of Curvature r (mm) | Lens Thickness or Distance d (mm) | Refractive Index N | Abbe No. $\nu$ |
|---|---|---|---|---|
| | $r_4 = -206.318$ | | | |
| | | $d_4 = 3.710$ | | |
| $L_3$ | $r_5 = 85.301$ | $d_5 = 4.161$ | $N_3 = 1.71300$ | $\nu_3 = 53.9$ |
| | $r_6 = 52.914$ | | | |
| | | $d_6 = 23.683$ | | |
| $L_4$ | $r_7 = 104.026$ | $d_7 = 38.455$ | $N_4 = 1.80610$ | $\nu_4 = 40.9$ |
| | $r_8 = -52.914$ | | | |
| | | $d_8 = 24.481$ | | |
| $L_5$ | $r_9 = -196.956$ | $d_9 = 17.754$ | $N_5 = 1.72342$ | $\nu_5 = 38.0$ |
| $L_6$ | $r_{10} = -124.352$ | $d_{10} = 4.161$ | $N_6 = 1.84666$ | $\nu_6 = 23.9$ |
| | $r_{11} = 146.676$ | | | |
| | | $d_{11} = 8.461$ | | |
| $L_7$ | $r_{12} = -274.954$ | $d_{12} = 8.842$ | $N_7 = 1.73400$ | $\nu_7 = 51.5$ |
| | $r_{13} = -77.738$ | | | |
| | | $d_{13} = 0.347$ | | |
| $L_8$ | $r_{14} = -1074.933$ | $d_{14} = 9.536$ | $N_8 = 1.71300$ | $\nu_8 = 53.9$ |
| | $r_{15} = -115.465$ | | | |

$f_B = 127.640$, where $f_B$ is the back focal length, $F_{1,2,3,4,5,6} = -169.837$, where $F_{1,2,3,4,5,6}$ is the combined focal length of lenses $L_1$ through $L_6$, and the sum of Petzval = 0.168.

2. A photographic wide angle lens system comprising seven elements composed of eight lenses, said elements consisting of a first element in the form of a negative meniscus lens $L_1$ convex to the object, a second element in the form of a positive meniscus lens $L_2$ concave to the object, a third element in the form of a negative meniscus lens $L_3$ convex to the object, a fourth element in the form of a positive lens in which two lenses, a positive lens $L_4$ and a negative lens $L_5$, are joined together, a fifth element in the form of a negative lens $L_6$, a sixth element in the form of a positive lens $L_7$, and a seventh element in the form of a positive lens $L_8$, wherein the radii of curvature $r$, the lens thicknesses or distance between lenses $d$, the refractive indices N and the Abbe Numbers $\nu$ of the lens system are:

Aperture ratio 1:2.0,
$F = 100$, where $F$ is the combined focal length of the whole system,
Angular field 75°

| Lens | Radius of Curvature r (mm) | Lens Thickness or Distance d (mm) | Refractive Index N | Abbe No. $\nu$ |
|---|---|---|---|---|
| $L_1$ | $r_1 = 161.392$ | $d_1 = 4.167$ | $N_1 = 1.51633$ | $\nu_1 = 64.1$ |
| | $r_2 = 65.764$ | | | |
| | | $d_2 = 30.833$ | | |
| $L_2$ | $r_3 = -284.153$ | $d_3 = 20.139$ | $N_2 = 1.72000$ | $\nu_2 = 50.2$ |
| | $r_4 = -223.321$ | | | |
| | | $d_4 = 5.486$ | | |
| $L_3$ | $r_5 = 83.656$ | $d_5 = 4.167$ | $N_3 = 1.71300$ | $\nu_3 = 53.9$ |
| | $r_6 = 54.749$ | | | |
| | | $d_6 = 22.986$ | | |
| $L_4$ | $r_7 = 114.990$ | $d_7 = 48.854$ | $N_4 = 1.80610$ | $\nu_4 = 40.9$ |
| | $r_8 = -49.854$ | | | |
| | | $d_8 = 10.938$ | | |
| $L_5$ | $r_9 = -177.063$ | | $N_5 = 1.72342$ | $\nu_5 = 38.0$ |
| | | $d_9 = 21.250$ | | |

-continued

| Lens | Radius of Curvature r (mm) | Lens Thickness or Distance d (mm) | Refractive Index N | Abbe No. $\nu$ |
|---|---|---|---|---|
| $L_6$ | $r_{10} = -110.330$ | $d_{10} = 8.090$ | $N_6 = 1.84666$ | $\nu_6 = 23.9$ |
| | $r_{11} = 171.084$ | | | |
| | | $d_{11} = 7.326$ | | |
| $L_7$ | $r_{12} = -228.944$ | $d_{12} = 12.396$ | $N_7 = 1.73400$ | $\nu_7 = 51.5$ |
| | $r_{13} = -78.323$ | | | |
| $L_8$ | $r_{14} = 3317.347$ | $d_{13} = 0.521$ | | |
| | $r_{15} = -126.916$ | $d_{14} = 12.222$ | $N_8 = 1.73400$ | $\nu_8 = 51.5$ |

$f_B = 127.467$, where $f_B$ is the back focal length, $F_{1,2,3,4,5,6} = -170.561$, where $F_{1,2,3,4,5,6}$ is the combined focal length of lenses $L_1$ through $L_6$, and the sum of Petzval = 0.168.

3. A photographic wide angle lens system comprising seven elements composed of eight lenses, said elements consisting of a first element in the form of a negative meniscus lens $L_1$ convex to the object, a second element in the form of a positive meniscus lens $L_2$ concave to the object, a third element in the form of a negative meniscus lens $L_3$ convex to the object, a fourth element in the form of a positive lens in which two lenses, a positive lens $L_4$ and a negative lens $L_5$, are joined together, a fifth element in the form of a negative lens $L_6$, a sixth element in the form of a positive lens $L_7$, and a seventh element in the form of a positive lens $L_8$, wherein the radii of curvature $r$, the lens thicknesses or distance between lenses $d$, the refractive indices N and the Abbe Numbers $\nu$ of the lens system are:

Aperture ratio 1:2.0,
$F = 100$, where $F$ is the combined focal length of the whole system,
Angle field 75°

| Lens | Radius of Curvature r (mm) | Lens Thickness or Distance d (mm) | Refractive Index N | Abbe No. $\nu$ |
|---|---|---|---|---|
| $L_1$ | $r_1 = 203.719$ | $d_1 = 4.514$ | $N_1 = 1.49831$ | $\nu_1 = 65.0$ |
| | $r_2 = 66.968$ | | | |
| | | $d_2 = 30.666$ | | |
| $L_2$ | $r_3 = -357.455$ | $d_3 = 26.111$ | $N_2 = 1.68250$ | $\nu_2 = 44.7$ |
| | $r_4 = -193.555$ | | | |
| | | $d_4 = 4.063$ | | |
| $L_3$ | $r_5 = 87.118$ | $d_5 = 4.618$ | $N_3 = 1.71300$ | $\nu_3 = 53.9$ |
| | $r_6 = 53.427$ | | | |
| | | $d_6 = 26.180$ | | |
| $L_4$ | $r_7 = 87.500$ | $d_7 = 37.500$ | $N_4 = 1.70154$ | $\nu_4 = 41.1$ |
| | $r_8 = -54.156$ | | | |
| | | $d_8 = 16.528$ | $N_5 = 1.72342$ | $\nu_5 = 38.0$ |
| | $r_9 = -112.263$ | | | |
| | | $d_9 = 15.799$ | | |
| $L_5$ | $r_{10} = -95.486$ | $d_{10} = 6.146$ | $N_6 = 1.84666$ | $\nu_6 = 23.9$ |
| | $r_{11} = 146.264$ | | | |
| | | $d_{11} = 9.757$ | | |
| $L_6$ | $r_{12} = -158.049$ | $d_{12} = 10.486$ | $N_7 = 1.73400$ | $\nu_7 = 51.5$ |
| | $r_{13} = -71.695$ | | | |
| | | $d_{13} = 0.347$ | | |

-continued

| Lens | Radius of Curvature r (mm) | Lens Thickness or Distance d (mm) | Refractive Index N | Abbe No. $\nu$ |
| --- | --- | --- | --- | --- |
| $L_7$ | $r_{14} = 1338.583$ $r_{15} = -123.855$ | $d_{14} = 10.174$ | $N_8=1.72600$ | $\nu_8=53.6$ |

$f_B = 133.757$, where $f_B$ is the back focal length,
$F_{1,2,3,4,5,6} = -154.392$, where $F_{1,2,3,4,5,6}$ is the combined focal length of the lenses $L_1$ through $L_6$, and the sum of Petzval = 0.193.

4. A photographic wide angle lens system comprising seven elements composed of eight lenses, said elements consisting of a first element in the form of a negative meniscus lens $L_1$ convex to the object, a second element in the form of a positive meniscus lens $L_2$ concave to the object, a third element in the form of a negative meniscus lens $L_3$ convex to the object, a fourth element in the form of a positive lens in which two lenses, a positive lens $L_4$ and a negative lens $L_5$, are joined together, a fifth element in the form of a negative lens $L_6$, a sixth element in the form of a positive lens $L_7$, and a seventh element in the form of a positive lens $L_8$, wherein the radii of curvature $r$, the lens thicknesses or distance between lenses $d$, the refractive indices N and the Abbe Numbers $\nu$ of the lens system are:

Aperture ratio 1:2.0,
$F = 100$, where $F$ is the combined focal length of the whole system,
Angular field 75°

| Lens | Radius of Curvature r (mm) | Lens Thickness or Distance d (mm) | Refractive Index N | Abbe No. $\nu$ |
| --- | --- | --- | --- | --- |
| $L_1$ | $r_1 = 221.750$ $r_2 = 70.339$ | $d_1 = 4.757$ $d_2 = 29.410$ | $N_1=1.49831$ | $\nu_1=65.0$ |
| $L_2$ | $r_3 = -316.656$ $r_4 = 191.116$ | $d_3 = 10.764$ $d_4 = 4.722$ | $N_2=1.67790$ | $\nu_2=53.3$ |
| $L_3$ | $r_5 = 96.181$ $r_6 = 53.646$ | $d_5 = 4.618$ $d_6 = 24.270$ | $N_3=1.71300$ | $\nu_3=53.9$ |
| $L_4$ | $r_7 = 92.708$ $r_8 = 63.700$ | $d_7 = 11.389$ $d_8 = 50.451$ | $N_4=1.72342$ | $\nu_4=38.0$ |
| $L_5$ | $r_9 = -139.976$ | | | |
| $L_6$ | $r_{10} = -102.431$ $r_{11} = 134.307$ | $d_9 = 13.681$ $d_{10} = 5.000$ | $N_5=1.80610$ $N_6=1.84666$ | $\nu_5=40.9$ $\nu_6=23.9$ |
| $L_7$ | $r_{12} = -272.177$ $r_{13} = -74.233$ | $d_{11} = 7.917$ $d_{12} = 11.319$ $d_{13} = 0.347$ | $N_7=1.73400$ | $\nu_7=51.5$ |
| $L_8$ | $r_{14} = -6944.444$ $r_{15} = -128.753$ | $d_{14} = 12.778$ | $N_8=1.72600$ | $\nu_8=53.6$ |

$f_B = 126.732$, where $f_B$ is the back focal length,
$F_{1,2,3,4,5,6} = -154.895$, where $F_{1,2,3,4,5,6}$ is the combined focal length of the lenses $L_1$ through $L_6$, and the sum of Petzval = 0.178.

* * * * *